United States Patent [19]

Morita et al.

[11] Patent Number: 4,555,351

[45] Date of Patent: * Nov. 26, 1985

[54] MICELLAR SLUG FOR OIL RECOVERY

[75] Inventors: Hiroshi Morita, Chiba; Yasuyuki Kawada, Funabashi; Junichi Yamada; Toshiyuki Ukigai, both of Chiba, all of Japan

[73] Assignee: Lion Corporation, Tokyo, Japan

[*] Notice: The portion of the term of this patent subsequent to Jul. 30, 2002 has been disclaimed.

[21] Appl. No.: 480,770

[22] Filed: Mar. 31, 1983

Related U.S. Application Data

[63] Continuation-in-part of Ser. No. 458,360, Jan. 17, 1983, Pat. No. 4,532,053.

[30] Foreign Application Priority Data

Jan. 28, 1982 [JP] Japan .................................. 57-10858

[51] Int. Cl.$^4$ .............................................. E21B 43/22
[52] U.S. Cl. .............................. 252/8.55 D; 166/274; 166/275
[58] Field of Search ................... 252/8.55 D, 312, 555; 166/274, 275, 273

[56] References Cited

U.S. PATENT DOCUMENTS

| 3,376,336 | 4/1968 | Stein et al. | 252/555 |
| 3,415,753 | 12/1968 | Stein et al. | 252/555 |
| 3,506,070 | 4/1970 | Jones | 166/273 |
| 3,508,611 | 4/1970 | Davis et al. | 252/309 X |
| 3,536,136 | 10/1970 | Jones | 166/252 |
| 3,808,156 | 4/1974 | Gorsich et al. | 252/545 |
| 3,867,317 | 2/1975 | Woo et al. | 252/555 |
| 4,064,076 | 12/1977 | Klisch et al. | 252/555 X |

*Primary Examiner*—Herbert B. Guynn
*Attorney, Agent, or Firm*—Armstrong, Nikaido, Marmelstein & Kubovcik

[57] ABSTRACT

A micellar slug for use in the recovery of oil, the slug containing a hydrocarbon, an aqueous medium, a surfactant, and a cosurfactant. The surfactant contains as an essential component an internal olefin sulfonate or sulfonates having 10 to 26 carbon atoms and having the specified compositions. This micellar slug has an excellent capability for decreasing an interfacial tension between oil and micro-emulsions and between water and micro-emulsions and an excellent salinity tolerance at a wide salt concentration range. Furthermore, the micro-emulsion can be maintained stable during the sweeping in the subterranean reservoirs even when the salt concentration of the formation water is changed.

6 Claims, No Drawings

MICELLAR SLUG FOR OIL RECOVERY

CROSS-REFERENCE TO RELATED APPLICATION

This application is a continuation-in-part of Ser. No. 458,360, filed Jan. 17, 1983, now U.S. Pat. No. 4,532,053.

BACKGROUND OF THE INVENTION

1. Field of the Invention

This invention relates to a micellar slug suitable for use in a micellar drive for recovering oil from subterranean reservoirs. More specifically, it relates to a micellar slug which is capable of forming micro-emulsions having a small interfacial tension at a high salt concentration and of recovering oil at a high recovery efficiency from subterranean reservoirs, and which is very stable during the sweeping in the subterranean reservoirs.

2. Description of the Prior Art

It is well known in the art that the so-called "primary recovery" methods, including pumping methods, can recover only a portion of the petroleum or crude oil (referred to as "oil" hereinafter) from subterranean reservoirs and leave substantial amounts of oil in the subterranean reservoirs.

In order to recover the remaining large amounts of oil from the subterranean reservoirs, the so-called "secondary recovery" methods have been proposed, wherein, for example, water or gas is injected into the subterranean reservoirs from an injection well at a pressure sufficient to increase the flowability of oil, steam is injected into subterranean reservoirs so as to effect the displacement of oil toward a production well, or oil in subterranean reservoirs is partially burned to heat the subterranean reservoirs so as to decrease the viscosity of the oil and increase the flowability of the oil.

Furthermore, the so-called various "tertiary recovery" methods, including a combination of secondary recovery methods and improved secondary recovery methods, have been proposed, wherein surfactants or water-soluble polymers are utilized. These methods are generally called "enhanced oil recovery" (EOR) methods.

Of the surfactants EOR methods, the recent "micellar drive" methods are to be noted. According to these methods, a micellar slug, that is, a clear micro-emulsion derived from water and oil such as petroleum, petroleum distillates, or fuel oil, is injected under pressure into the subterranean reservoirs for the recovery of oil in the subterranean reservoirs. These EOR methods are disclosed in, for example, U.S. Pat. Nos. 3,506,070, 3,613,786, 3,740,343, 3,983,940, 3,990,515, 4,017,405, and 4,059,154. These prior arts disclose that various kinds of surfactants including anionic-, nonionic-, and cationic-type surfactants can be used alone or in any mixture thereof in the formation of micellar slugs. Examples of such surfactants are petroleum sulfonates, alkylaryl sulfonates, dialkyl sulfosuccinates, alkane sulfonates, polyoxyethylene alkylether sulfates, alpha-olefin sulfonate, polyoxyethylene alkylethers, polyoxyethylene alkylphenylethers, polyol fatty acid esters, alkyltrimethyl ammonium salts, and dialkyldimethyl ammonium salts.

The micellar slugs should have the following characteristics to recover oil from subterranean reservoirs at a high efficiency:

Sufficiently low interfacial tensions between oil and the micro-emulsions and between formation water and the micro-emulsions; resistance to adsorption of the surfactants to subterranean rocks during the sweeping in the subterranean reservoirs and stability of the micro-emulsions even when the surfactants are adsorbed onto the subterranean rocks; salinity tolerance of the micellar slugs at a wide salt concentration range since the salt concentration range of the formation water extends widely from a low to high concentration; and low cost availability of the micellar slugs, since a large amount of a micellar slug is necessary to recover oil from subterranean reservoirs.

SUMMARY OF THE INVENTION

The object of the present invention is to provide, for the recovery of oil, a micellar slug having an excellent oil-micro-emulsion and water-micro-emulsion interfacial tension decreasing capabilities and an excellent salinity tolerance at a wide salt concentration range and being capable of maintaining the micro-emulsions stable during the sweeping in the subterranean reservoirs even when the salt concentration of the formation water is changed.

Other objects and advantages of the present invention will be apparent from the following description.

In accordance with the present invention, there is provided a micellar slug, for the recovery of oil, consisting essentially of a hydrocarbon, an aqueous medium, a surfactant, and a cosurfactant, the surfactant containing, as an essential component, an internal olefin sulfonate or sulfonates having 10 to 26 carbon atoms. The difference between the maximum and minimum carbon numbers of the internal olefin sulfonates is not more than 5 and the content of the same carbon number component of the internal olefin sulfonates present in the largest amount in the internal olefin sulfonates is 80% by weight or more.

DESCRIPTION OF THE PREFERRED EMBODIMENTS

The micellar slugs desirably used for the recovery of oil are transparent or translucent micro-emulsions containing about 2% to about 90% by weight of a hydrocarbon, about 4% to about 95% by weight of an aqueous medium, about 1% to about 30% by weight of a surfactant containing, as an essential constituent, internal olefin sulfonates having 10 to 26 carbon atoms, and about 0.1% to about 20% by weight of a cosurfactant.

The aqueous medium usable in the formation of the micellar slug of the present invention includes soft water, water containing inorganic salts, and brine. For example, rain water, river water, lake water, formation water, oil stratum water, and seawater can be freely used in the formation of the micellar slug of the present invention.

Internal olefin sulfonates having a good salinity tolerance and hard-water resistance are used as an essential component of the surfactant in the micellar slugs of the present invention. Therefore, brine having a salt concentration of up to about 10% by weight can be used in the formation of the micellar slugs of the present invention. When another adequate surfactant is used together with the internal olefin sulfonate or when a certain cosurfactant is selected, brine including up to about 15% by weight of inorganic salts can be used in the formation of the micellar slugs of the present invention. Furthermore, the micellar slugs of the present invention can be resistant against multivalent metal ions, for example, about 5,000 ppm of a Mg ion (i.e., about 2.6% by weight of MgSO$_4$). Thus, water (or brine) usable in the formation of the micellar slugs of the present invention can contain 0% to about 15% by weight, desirably about 0.5% to about 12% by weight and more desirably about 1% to about 10% by weight, of inorganic salts. Typical examples of the inorganic salts contained in the water (or brine) are NaCl, KCl, Na$_2$SO$_4$, and K$_2$SO$_4$. For instance, seawater contains about 3.5% by weight of inorganic salts including about 1,600 ppm, in terms of a Mg ion, of divalent metal ions. This salt concentration is within the desirable salt concentration range of the present invention.

The internal olefin sulfonates usable as an essential surfactant in the present invention are those obtained by sulfonating internal olefins containing as a main constituent vinylene-type monoolefin having 10 to 26 carbon atoms, desirably 12 to 24 carbon atoms and having a general formula:

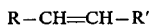
$$R-CH=CH-R'$$

wherein R and R' are independently straight- or branched-chain saturated hydrocarbon radicals having 1 or more carbon atoms provided that the total carbon atom numbers of R and R' is 8 to 24, desirably 10 to 22, and optionally containing about 33% by weight (about one third of the olefins) or less of tri-substituted type monoolefins, followed by neutralizing the sulfonated products with appropriate bases and, then, optionally, hydrolyzing the neutralized products. The internal olefin sulfonates thus prepared generally contain about 10% to about 60% by weight of alkenyl sulfonates having a double bond and about 90% to about 40% by weight of hydroxyalkane sulfonates and also contain about 80% by weight or more of monosulfonates and about 20% by weight or less of disulfonates. It should be noted, however, that internal olefin sulfonates having the compositions different from the above-mentioned composition ratios can be prepared by appropriately selecting the sulfonation conditions and hydrolysis conditions. Generally speaking, the increase in the carbon atom number of the internal olefin tends to result in an increase in the composition ratio of the alkenylsulfonate. On the other hand, the increase in the mol ratio of the sulfonating agent to the internal olefin during the sulfonation tends to result in an increase in the composition ratio of the disulfonate.

The internal olefin sulfonate or sulfonates used in the present invention should be that or those having the single carbon numbers, or those having similar carbon numbers. Accordingly, the difference between the maximum and minimum carbon numbers of the internal olefin sulfonates should be not more than 5 and the content of the component having the same carbon number present in the largest amount in the internal olefin sulfonates is 80% by weight or more. Since the effect of the difference between carbon numbers on the amount of the internal olefin sulfonates adsorbed onto the subterranean rocks is decreased with the sharpness of the carbon number distribution of the internal olefin sulfonates, the micro-emulsions be maintained stable for a long time when the micro-emulsions are injected into the subterranean reservoirs and the reservoirs are swept. The desirable internal olefin sulfonates are those containing 90% by weight or more of certain single carbon number component.

The internal olefin sulfonates usable in the present invention can be alkali metal salts, alkaline earth metal salts, ammonium salts, and organic amine salts thereof. The desirable counter cations are Na, K, Mg, Ca, NH$_4$, and alkanolammonium.

Examples of internal olefin sulfonates usable in the formation of the micellar slugs of the present invention are: internal olefin sulfonate having 12, 14, 16, 18, 20, 22, and 24 carbon atoms; internal olefin sulfonates having 15 to 17 carbon atoms containing 80% by weight or more of internal olefin sulfonate having 16 carbon atoms, internal olefin sulfonates having 16 to 18 carbon atoms containing 80% by weight or more of internal olefin sulfonate having 18 carbon atoms, and internal olefin sulfonates having 13 to 14 carbon atoms containing 90% by weight or more of internal olefin sulfonate having 14 carbon atoms. These sulfonates may be used alone or in any mixture thereof.

As mentioned above, the micellar slugs of the present invention contain about 1% to about 30% by weight of the surfactant. However, the micellar slugs desirably contain about 3% to about 25% by weight of the surfactant, taking into consideration both low interfacial tensions and reasonable cost. The amount of the internal olefin sulfonates having 10 to 26 carbon atoms should be at least 80% by weight, desirably 90% by weight or more, based on the total amount of the surfactants contained in the micellar slugs.

The hydrocarbons usable as an oil component in the present invention include, for example, petroleum, liquefied petroleum gas, crude gasoline (naphtha), kerosine, diesel oil, and fuel oil. The recovered petroleum is desirably used due to its low cost and availability as well as its composition, which is similar to that of the oil contained in subterranean reservoirs. As mentioned above, the micellar slugs of the present invention can contain about 2% to about 90% by weight of hydrocarbons. The desirable concentration of hydrocarbons is within the range of about 3% to about 40% by weight whereby an oil-in-water (O/W) type emulsion is formed, since the use of a large amount of hydrocarbons is not economical.

The cosurfactants used in the formation of the micellar slugs of the present invention are an essential constituent for forming micro-emulsions associated with the surfactants. The cosurfactants usable in the present invention are those having an alcoholic hydroxyl group. The desirable cosurfactnats are alcohols having the general formula:

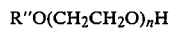
$$R''O(CH_2CH_2O)_nH$$

wherein n is a number of from 0 to about 4 and R'' is an alkyl or alkenyl group having 4 to 8 carbon atoms when n is zero and an alkyl or alkenyl group having 6 to 15 carbon atoms, a phenyl group, or an alkylphenyl group having 7 to 16 carbon atoms when n is not zero. The aliphatic groups of R'' may be straight-chain or branched-chain groups.

Examples of such alcohols are butanols, pentanols, hexanols, 2-ethylhexanol or other octanols, polyoxyethylene hexylethers ($\bar{n}=1$), polyoxyethylene decylethers ($\bar{n}=2$), polyoxyethylene tridecylethers ($\bar{n}=4$), polyoxyethylene butylphenylethers ($\bar{n}=2$), polyoxyethylene nonylphenylethers ($\bar{n}=3$), and polyoxyethylene dodecylphenylethers ($\bar{n}=4$).

As mentioned above, the micellar slugs of the present invention can contain about 0.1% to about 20% by weight of the cosurfactants. However, the desirable concentration of the cosurfactants is within the range of about 1% to about 10% by weight from the viewpoints of the stability of the micro-emulsions and the decreasing capacity for the interfacial tensions.

As mentioned above, the micellar slugs of the present invention contain internal olefin sulfonates having 10 to 26 carbon atoms as an essential or major constituent of the surfactants. However, other auxiliary surfactants can also be included, together with the internal olefin sulfonates.

Examples of such auxiliary surfactants are anionic surfactants and nonionic surfactants such as petroleum sulfonates, alkylbenzene sulfonates, polyoxyethylene alkylether sulfates, dialkyl sulfosuccinates, alpha-olefin sulfonates, paraffin sulfonates, soaps, higher alcohol ethoxylates, alkylphenol ethoxylates, polyol fatty acid esters, fatty acid alkylol amides, and polyoxyethylene fatty acid amides.

The viscosity of the micellar slugs of the present invention can be suitably adjusted by selecting the kinds and amounts of the components of the micro-emulsions. However, when a micellar slug having a high viscosity is desired, an appropriate known thickening agent such as a water-soluble polymer can be added to the micellar slugs. Examples of thickening agents usable in the formation of the micellar slugs are heteropolysaccharides, naphthalenesulfonic acid-formaldehyde condensates, polyacrylamides, polyacrylates, hydroxyethylcelluloses, and carboxymethylcelluloses.

The micellar slugs of the present invention can be readily obtained by any known method of production. For example, the hydrocarbons, the surfactants, the aqueous medium, and the cosurfactnats can be mixed in any mixing order by using conventional mixing devices, mixing temperatures, and mixing pressures.

The recovery of oil from subterranean reservoirs can be carried out by means of any conventional micellar drive method by using the micellar slugs of the present invention. For instance, the micellar slugs are injected under pressure into at least one injection well of the subterranean reservoirs. Then, at least one driving fluid such as flood water and/or aqueous solution of the above-mentioned thickening agent is injected into the injection well so as to transfer or drive the remaining oil toward an oil production well and to recover the oil from the production well. The suitable amount of the micellar slugs injected into the injection well is about 5% about 25% by volume of the porosity of the subterranean reservoirs.

The suitable salt concentration of the subterranean water in the subterranean reservoirs where the micellar slugs of the present invention can be applied is 0% to about 15% by weight, desirably about 0.1% to about 12% by weight, and, more desirably, about 0.5% to about 10% by weight. The salt concentration of water used in the formation of the micellar slugs is desirably the same as that of the subterranean water from the viewpoints that the salt concentration is changed during the sweeping, although this is not essential.

As mentioned hereinabove, the micellar slugs of the present invention contain internal olefin sulfonates having a sharp distribution of the carbon numbers as an essential component of the surfactant. The resultant micellar slugs therefore have an excellent salinity tolerance and hard-water resistance and are capable of forming micro-emulsions at a very wide salt concentration from soft water to brine having a high salt concentration. Furthermore, the micellar slugs of the present invention have very small interfacial tensions between water and the micro-emulsions and between oil and the micro-emulsions and have a good dynamic stability since the effect of the adsorption of the surfactants onto the subterranean rocks during the sweeping is small. As a result, the following remarkable advantageous features can be obtained:

(1) Either soft water, seawater, or subterranean water having a high salt concentration can be freely used;
(2) The micellar slugs injected into the subterranean reservoirs are subjected to no substantial adverse affects by inorganic salts present in the subterranean reservoirs;
(3) The micellar drive method can be readily applied in subterranean reservoirs containing oil having a low viscosity to a high viscosity; and
(4) A high oil recovery efficiency can be attained since stable micro-emulsions are maintained in the subterranean reservoirs until oil banks are formed.

EXAMPLES

The present invention now will be further illustrated by, but is by no means limited to, the following examples, in which the component ratios or amounts of samples used are based on "% by weight" unless otherwise specified.

EXAMPLE 1

Micro-emulsions were prepared by weighing 10.5% of sodium $C_{13}$–$C_{18}$ internal olefin sulfonate ($C_{13}$–$C_{18}$ IOS-Na) or $C_{15}$–$C_{17}$ IOS-Na containing 90% of $C_{16}$ IOS-Na as a surfactant, 4.5% of amyl alcohol as a cosurfactant, 17% of fuel oil (ASTM No. 2 oil), and 68% of an aqueous solution of 5% of sodium chloride dissolved in demineralized water as brine in a beaker. The resultant mixture was stirred at 100 rpm for 30 minutes at a temperature of 71° C.

The micro-emulsion forming capabilities, and the interfacial tension decreasing capabilities and the oil recovery efficiencies of the micro-emulsions thus prepared were evaluated as follows. The results are shown in Table 1.

The micro-emulsion forming capabilities were determined from the visual appearances of the micro-emulsions according to the following:
o . . . A transparent or translucent and homogeneous micro-emulsion was formed
x . . . An opaque suspension, rather than a micro-emulsion was formed.

The interfacial tensions were measured by a spinning drop type tensiometer at 71° C. in an appropriately diluted system.

The oil recovery tests were carried out by using Berea sandstone core having a size of 3.8 cm diameter and 28 cm length and having a permeability of about 500 mD and a porosity of about 20%. The core sufficiently saturated with brine was set in a core holder and, then, fuel oil was injected under pressure into the core at a feed rate of 6 cc/min until no brine was discharged. Then, brine was injected under pressure at the same feed rate in a water drive method until the content of the fuel oil in the effluent became less than 0.1%. Thus, the fuel oil was recovered. After the water drive method, the core holder and the micro-emulsions were placed in a constant temperature bath at a temperature of 71° C. for a micellar drive method. The micro-emulsions were first injected under pressure into the core in an amount of 10% by volume of the pore volume, a polymer solution (i.e., 1000 ppm of Xanthan gum solution in a brine solution) was then injected under pressure in an amount of 100% by volume of the pore volume, and, finally, a brine was injected under pressure in an amount of 100% by volume of the pore volume. Thus, the fuel oil was recovered. The injection rate under pressure was 2 feet/day. The oil recovery efficiency was determined by measuring the amount of water in the core after the test in a toluene azeotropic method to convert the recovery amount of the fuel oil.

TABLE 1

|  | Sample No. | |
|---|---|---|
|  | 1 | 2 |
| Surfactant | $C_{15}$-$C_{17}$ IOS—Na | $C_{13}$-$C_{18}$ IOS—Na |
| Carbon number distribution of surfactant | $C_{16}$ IOS—Na 90% | about 17% of each carbon number |
| Micro-emulsion forming capability | o | o |
| Interfacial tension ($\times 10^{-3}$ dyne/cm) | 4.8 | 5.1 |
| Oil recovery (%) | 93 | 90 |

EXAMPLE 2

Micro-emulsions were prepared by weighing 10.5% of $C_{15}$-$C_{17}$ IOS-Na containing 90% of $C_{16}$ IOS-Na as a surfactant, 4.5% of amyl alcohol as a cosurfactant, 17% of fuel oil (ASTM No. 2 oil) as a hydrocarbon, and 68% of an aqueous solution of a given amount of sodium chloride, magnesium, or calcium chloride dissolved in demineralized water as brine in a beaker. The resultant mixture was stirred at 100 rpm for 30 minutes at a temperature of 71° C.

The micro-emulsion forming capabilities, the interfacial tensions, and the oil recovery efficiencies of the micro-emulsions were evaluated in the same manner as in Example 1. The results are shown in Table 2 below.

TABLE 2

|  |  | Sample No. | | | | |
|---|---|---|---|---|---|---|
|  |  | 3 | 4 | 5 | 6 | 7 |
| Surfactant |  | $C_{15}$-$C_{17}$ IOS—Na | | | | |
| Brine (%) | NaCl | 2 | 7 | 8 | 8 | 12 |
|  | CaCl$_2$ | — | — | 0.8 | — | — |
|  | MgCl$_2$ | — | — | — | 0.8 | — |
| Micro-emulsion forming capability |  | o | o | o | o | o |
| Interfacial tension ($\times 10^{-3}$ dyne/cm) |  | 5.1 | 4.6 | 4.3 | 4.2 | 4.4 |
| Oil recovery (%) |  | 92 | 93 | 93 | 94 | 92 |

EXAMPLE 3

Micro-emulsions were prepared by weighing 10.5% of $C_{16}$-$C_{18}$ IOS-NH$_4$, $C_{13}$-$C_{14}$ IOS-Mg, or $C_{20}$ IOS-K as a surfactant, 4.5% of amyl alcohol as a cosurfactant, 17% of fuel oil (ASTM No. 2 oil) as a hydrocarbon, 68% of an aqueous solution of 8% of sodium chloride dissolved in demineralized water as brine in a beaker. The resultant mixture was stirred at 100 rpm for 30 minutes at a temperature of 71° C.

The micro-emulsion forming capabilities, the interfacial tensions, and the oil recovery efficiencies of the micro-emulsions were evaluated in the same manner as in Example 1. The results are shown in Table 3 below.

TABLE 3

|  | Sample No. | | |
|---|---|---|---|
|  | 8 | 9 | 10 |
| Surfactant | $C_{16}$-$C_{18}$ IOS—NH$_4$ | $C_{13}$-$C_{14}$ IOS—Mg | $C_{20}$ IOS—K |
|  |  |  | $C_{20}$ IOS—K |
| Main component (%) | $C_{16}$ IOS—NH$_4$ (80) | $C_{14}$ IOS—Mg (90) | $C_{14}$ (100) |
| Micro-emulsion forming capability | o | o | o |
| Interfacial tension ($\times 10^{-3}$ dyne/cm) | 4.9 | 9.0 | 3.8 |
| Oil recovery (%) | 93 | 90 | 94 |

REFERENCE EXAMPLE

Micro-emulsions were prepared by using $C_{14}$-$C_{18}$ IOS-Na, $C_{20}$-$C_{24}$ IOS-Na, and $C_{15}$-$C_{17}$ IOS-Na as a surfactant. The cosurfactants, hydrocarbons, and brine were changed as shown in Table 4. The results are shown in Table 4 below.

As is clear from the results shown in Table 4, the micro-emulsions could be formed by using IOS when the compositions were changed.

TABLE 4

|  | Reference Sample No. | | | | | | | |
|---|---|---|---|---|---|---|---|---|
|  | 1 | 2 | 3 | 4 | 5 | 6 | 7 | 8 |
| Anionic surfactant |  |  |  |  |  |  |  |  |
| $C_{14}$-$C_{18}$ IOS—Na | — | — | — | 10.5 | — | 10.5 | — | — |
| $C_{20}$-$C_{24}$ IOS—Na | — | — | 10.5 | — | 14 | — | 10.5 | 10.5 |
| $C_{15}$-$C_{17}$ IOS—N$_a$ | 10.5 | 10.5 | — | — | — | — | — | — |
| Cosurfactant |  |  |  |  |  |  |  |  |
| Amyl alcohol | 4.5 | 4.5 | 4.5 | — | 6 | 4.5 | 4.5 | — |
| Isopropyl alcohol | — | — | — | 4.5 | — | — | — | 4.5 |
| Hydrocarbon |  |  |  |  |  |  |  |  |
| Kerosine | — | — | — | 8.5 | 8 | — | — | 2.5 |
| Fuel oil | 8.5 | 17 | 17 | — | — | 17 | 17 | — |
| Water |  |  |  |  |  |  |  |  |
| Brine NaCl 0.5% | — | — | 68 | — | — | — | — | 59.5 |
| Brine NaCl 2.0% | — | — | — | — | — | — | 68 | — |
| Brine NaCl 4.0% | 76.5 | — | — | 76.5 | 72 | — | — | — |
| Brine NaCl 8.0% | — | 68 | — | — | — | 68 | — | — |
| Properties |  |  |  |  |  |  |  |  |
| Visual appearance | o | o | o | o | o | o | o | o |
| Interfacial tension (x 10$^{-2}$ dyne/cm) | 0.09 | 0.08 | 0.10 | 0.27 | 0.95 | 0.52 | 0.07 | 0.07 |
| Viscosity (centipoise) | 5 | 6 | 18 | 12 | 42 | 19 | 20 | 19 |

We claim:

1. A micellar slug for use in the recovery of oil, said slug consisting essentially of a hydrocarbon, an aqueous medium containing about 2% to 15% inorganic salt, a surfactant and a consurfactant said surfactant containing, as an essential component, an internal olefin sulfonate having 10 to 26 carbon atoms the difference between the maximum and minimum carbon numbers of the internal olefin sulfonates being not more than 5 and the content of the same carbon number component of the internal olefin sulfonates present in the largest amount in the internal olefin sulfonates being 80% by weight or more.

2. A micellar slug as claimed in claim 1, wherein said internal olefin sulfonates contain about 40% to about 90% by weight of hydroxyalkane sulfonates and about 60% to about 10% by weight of alkenyl sulfonates.

3. A micellar slug as claimed in claim 1, wherein the content of disulfonates in the internal olefin sulfonates is about 20% by weight or less.

4. A micellar slug as claimed in claim 1, wherein said surfactant is internal olefin sulfonates having 12 to 24 carbon atoms.

5. A micellar slug as claimed in claim 1, wherein said micellar slug consists essentially of about 2% to about 90% by weight of the hydrocarbon, about 4% to about 95% by weight of the aqueous medium, about 1% to about 30% by weight of the surfactant, and about 0.1% to about 20% by weight of the cosurfactant.

6. A micellar slug as claimed in claim 1, wherein said cosurfactant has the general formula:

$$R''O(CH_2CH_2O)_nH$$

wherein n is a number of from 0 to about 4 and R'' is an alkyl or alkenyl group having 4 to 8 carbon atoms when n is zero and an alkyl or alkenyl group having 6 to 15 carbon atoms, a phenyl group, or an alkylphenyl group having 7 to 16 carbon atoms when n is not zero.

* * * * *